United States Patent
Koprowski et al.

(10) Patent No.: US 11,568,724 B2
(45) Date of Patent: Jan. 31, 2023

(54) SYSTEMS AND METHOD TO IDENTIFYING AVAILABLE WATCHERS OF AN OBJECT OF INTEREST FROM PLURALITY OF RESPONDERS AT AN INCIDENT SCENE

(71) Applicant: MOTOROLA SOLUTIONS, INC., Chicago, IL (US)

(72) Inventors: Stefan Koprowski, Myslenice (PL); Piotr Bartczak, Cracow (PL); Mariusz Wawrowski, Wawrzenczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 131 days.

(21) Appl. No.: 16/613,773

(22) PCT Filed: May 26, 2017

(86) PCT No.: PCT/PL2017/050031
§ 371 (c)(1),
(2) Date: Nov. 14, 2019

(87) PCT Pub. No.: WO2018/217110
PCT Pub. Date: Nov. 29, 2018

(65) Prior Publication Data
US 2021/0134129 A1 May 6, 2021

(51) Int. Cl.
*G08B 13/196* (2006.01)
*G05D 1/00* (2006.01)
(Continued)

(52) U.S. Cl.
CPC ..... *G08B 13/19656* (2013.01); *G05D 1/0094* (2013.01); *G06V 20/52* (2022.01); *G08B 27/005* (2013.01); *H04N 7/18* (2013.01)

(58) Field of Classification Search
CPC ............ G08B 13/19656; G08B 27/005; G05D 1/0094; G06K 9/00771; H04N 7/18
(Continued)

(56) References Cited

U.S. PATENT DOCUMENTS 5,973,309 A   10/1999   Livingston
6,903,343 B2   6/2005   Amon et al.
(Continued)

FOREIGN PATENT DOCUMENTS

| CN | 103878408 A | 6/2014 |
| GB | 2455837 A | 6/2009 |
| WO | 03/067360 A2 | 8/2009 |

OTHER PUBLICATIONS

International Search Report and Written Opinion dated Sep. 20, 2017 for PCT/PL2017/050031 (11 pages).
(Continued)

*Primary Examiner* — John W Miller
*Assistant Examiner* — Omer Khalid
(74) *Attorney, Agent, or Firm* — Michael Best & Friedrich LLP

(57) ABSTRACT

Methods and systems for identifying watchers of an object of interest at an incident scene. One method includes receiving, with an electronic processor, an object identifier corresponding to the object of interest. The method includes determining a watcher status for the object of interest. The method includes generating a notification based on the watcher status and the object identifier. The method includes transmitting, with a communication interface communicatively coupled to the electronic processor, the notification to an available watcher at the incident scene.

16 Claims, 5 Drawing Sheets

(51) Int. Cl.
*G08B 27/00* (2006.01)
*H04N 7/18* (2006.01)
*G06V 20/52* (2022.01)

(58) Field of Classification Search
USPC .......................................................... 348/144
See application file for complete search history.

(56) References Cited

U.S. PATENT DOCUMENTS

| | | | | |
|---|---|---|---|---|
| 6,930,687 | B2 * | 8/2005 | Grosvenor | G06T 13/80 |
| | | | | 348/222.1 |
| 7,209,035 | B2 * | 4/2007 | Tabankin | G08B 13/19684 |
| | | | | 340/539.22 |
| 7,460,150 | B1 * | 12/2008 | Coughlan | H04N 7/147 |
| | | | | 348/333.03 |
| 9,465,129 | B1 * | 10/2016 | Olsson | G01V 3/15 |
| 2010/0026802 | A1 * | 2/2010 | Titus | G08B 13/19613 |
| | | | | 348/143 |
| 2010/0034424 | A1 | 2/2010 | Goossen | |
| 2015/0208058 | A1 * | 7/2015 | Denizot | G06T 7/292 |
| | | | | 348/47 |
| 2016/0019427 | A1 | 1/2016 | Martin et al. | |
| 2016/0065903 | A1 | 3/2016 | Wang et al. | |
| 2017/0076140 | A1 | 3/2017 | Waniguchi et al. | |
| 2018/0176474 | A1 * | 6/2018 | Blanco | H04N 5/23293 |

OTHER PUBLICATIONS

Examination Report No. 2 issued by the Auslialian Government for Application No. 2017415611 dated Sep. 11, 2020 (3 pages).
Examination Report issued by the Auslialian Government for Application No. 2017415611 dated Jun. 25, 2020 (5 pages).
Examination Report No. 3 issued by the Auslialian Government for Application No. 2017415611 dated Nov. 25, 2020 (4 pages).
Office Action issued by the European Patent Office for Application No. 17736778.6 dated Nov. 27, 2020 (5 pages).
European Patent Office Communication Pursuant to Rules 161(1) and 162 EPC dated Jan. 7, 2020 for related European Application No. 17736778.6 (3 pages).

* cited by examiner

SYSTEMS AND METHOD TO IDENTIFYING AVAILABLE WATCHERS OF AN OBJECT OF INTEREST FROM PLURALITY OF RESPONDERS AT AN INCIDENT SCENE

BACKGROUND OF THE INVENTION

Public safety personnel (for example, first responders, investigators, and the like) responding to an incident scene may be equipped with video recording devices to document the response to an incident. The resulting video includes objects of interest located at the incident scene during the response. Objects of interest include people, vehicles, buildings, or portions of buildings, and other physical objects involved or potentially involved in the incident. In some instances, the effectiveness of the response or the safety of the responders to an incident may depend on whether the incident scene is under adequate visual control. The video of the incident may be used subsequent to the incident as evidence in criminal trials or other official investigations or proceedings, or for training purposes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
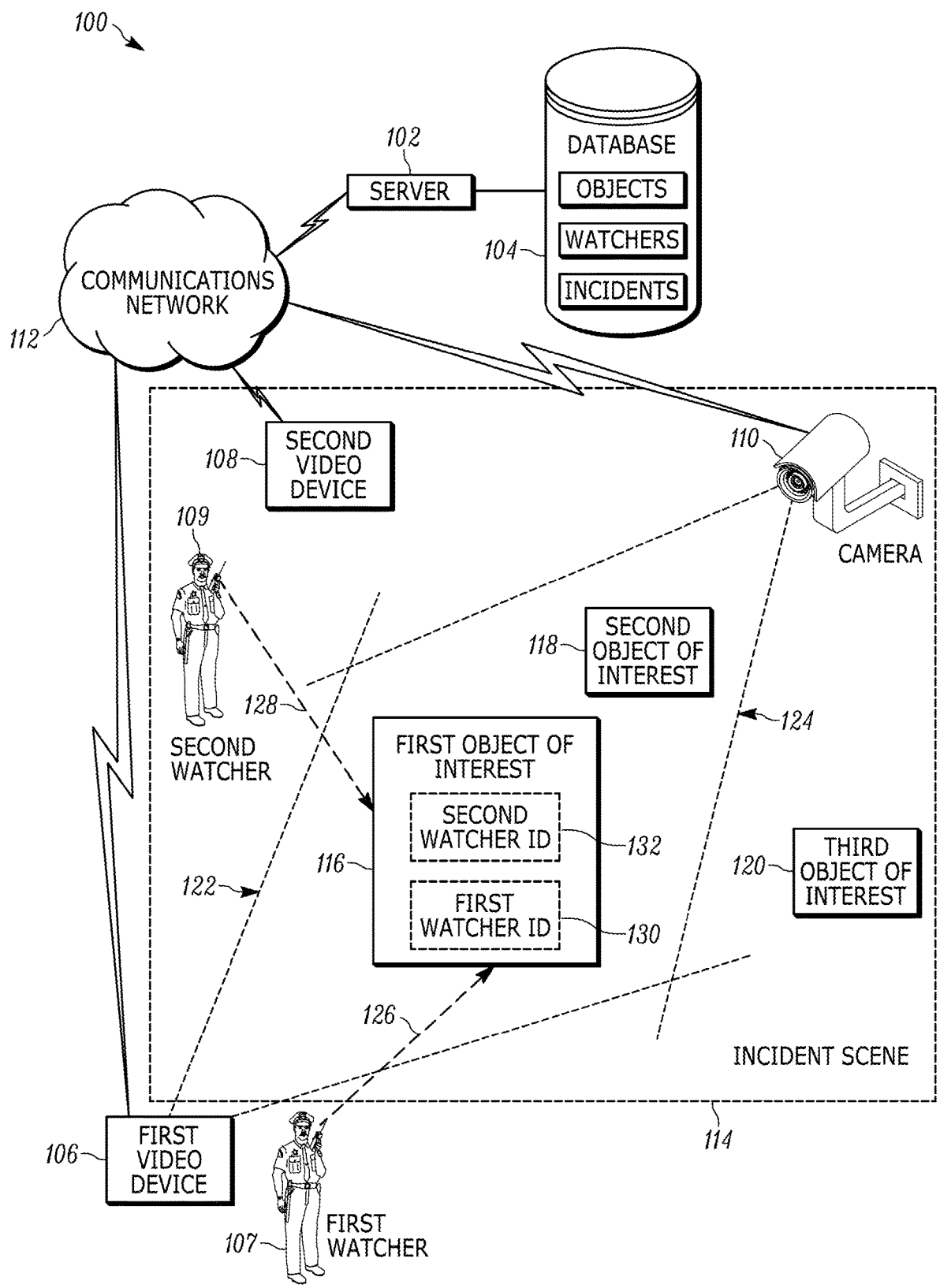
FIG. 1 is a diagram of a system for monitoring objects of interest at an incident scene in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel responding to an incident scene may be equipped with video recording devices to document the response to an incident. For example, public safety personnel may use body worn cameras, helmet cameras, or smart glasses to take video of their actions responding to the incident. In addition, other cameras (for example, traffic cameras, surveillance cameras, vehicle dash cameras, and the like) may capture video of the incident. The resulting video feeds include objects of interest located at the incident scene during the response. Objects of interest include people, vehicles, buildings, or portions of buildings, and other physical objects involved or potentially involved in the incident. In some instances, the effectiveness of the response or the safety of the responders to the incident may depend on whether the incident scene is under adequate visual control. In other cases, when and by whom an object of interest was observed during the incident may need to be determined subsequent to the incident. For example, video of the incident may be used as evidence in criminal trials, other official investigations or proceedings, or for training purposes.

Although video streams are recorded for some individual responders, the video stream itself may not be enough to indicate that the responder was observing a particular object at a particular time. For example, several objects of interest may be present in the responder's field of view. Additionally, some video sources (for example, a stationary camera) may not be associated with an individual responder. As a consequence, current video recording and playback systems are unable to reliably identify whether objects of interests are or were being watched during an incident. Accordingly, systems and methods are provided herein for, among other things, identifying watchers of an object of interest at an incident scene.

One example embodiment provides a system for identifying watchers of an object of interest at an incident scene. The system includes a communication interface and an electronic processor communicatively coupled to the communication interface. The electronic processor is configured to receive, via the communication interface, an object identifier corresponding to the object of interest. The electronic processor is configured to determine a watcher status for the object of interest. The electronic processor is configured to generate a notification based on the watcher status and the object identifier. The electronic processor is configured to transmit the notification to an available watcher at the incident scene.

Another example embodiment provides a method for identifying watchers of an object of interest at an incident scene. The method includes receiving, with an electronic processor, an object identifier corresponding to the object of interest. The method includes determining a watcher status for the object of interest. The method includes generating a notification based on the watcher status and the object identifier. The method includes transmitting, with a communication interface communicatively coupled to the electronic processor, the notification to an available watcher at the incident scene.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 3:
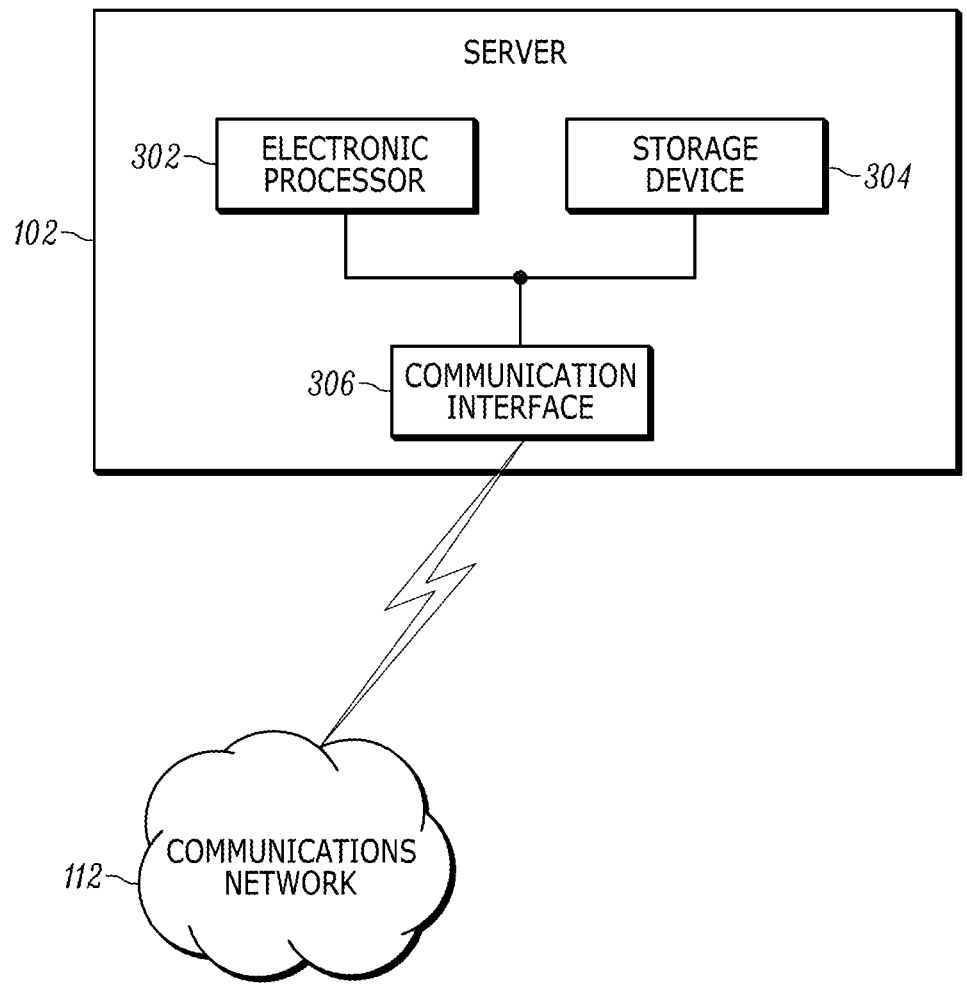
FIG. 3 is a diagram of a server of the system of FIG. 1 in accordance with some embodiments.

FIG. 1 illustrates an example system 100 for monitoring objects of interest at an incident scene. In the example illustrated, the system 100 includes a server 102 and a database 104. The server 102, described more particularly below with respect to FIG. 3, is communicatively coupled to, and writes data to and from, the database 104. As illustrated in FIG. 1, the database 104 may be a database housed on a suitable database server communicatively coupled to and accessible by the server 102. In alternative embodiments, the database 104 may be part of a cloud-based database system external to the system 100 and accessible by the server 102 over one or more additional networks. In some embodiments, all or part of the database 104 may be locally stored on the server 102. In some embodiments, as described below, the database 104 electronically stores data on objects of interest (for example, a first object of interest 116, a second object of interest 118, and a third object of interest 120), watchers (for example, a first watcher 107 and a second watcher 109), and incidents. In some embodiments, the server 102 and the database 104 are part of a computer-aided dispatch system.

The server 102 is communicatively coupled to a first video device 106, a second video device 108, and a camera 110 via a communications network 112. The communications network 112 is a communications network including wireless and wired connections. The communications network 112 may be implemented using a wide area network, such as the Internet, a local area network, such as a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof.

Figure 2:
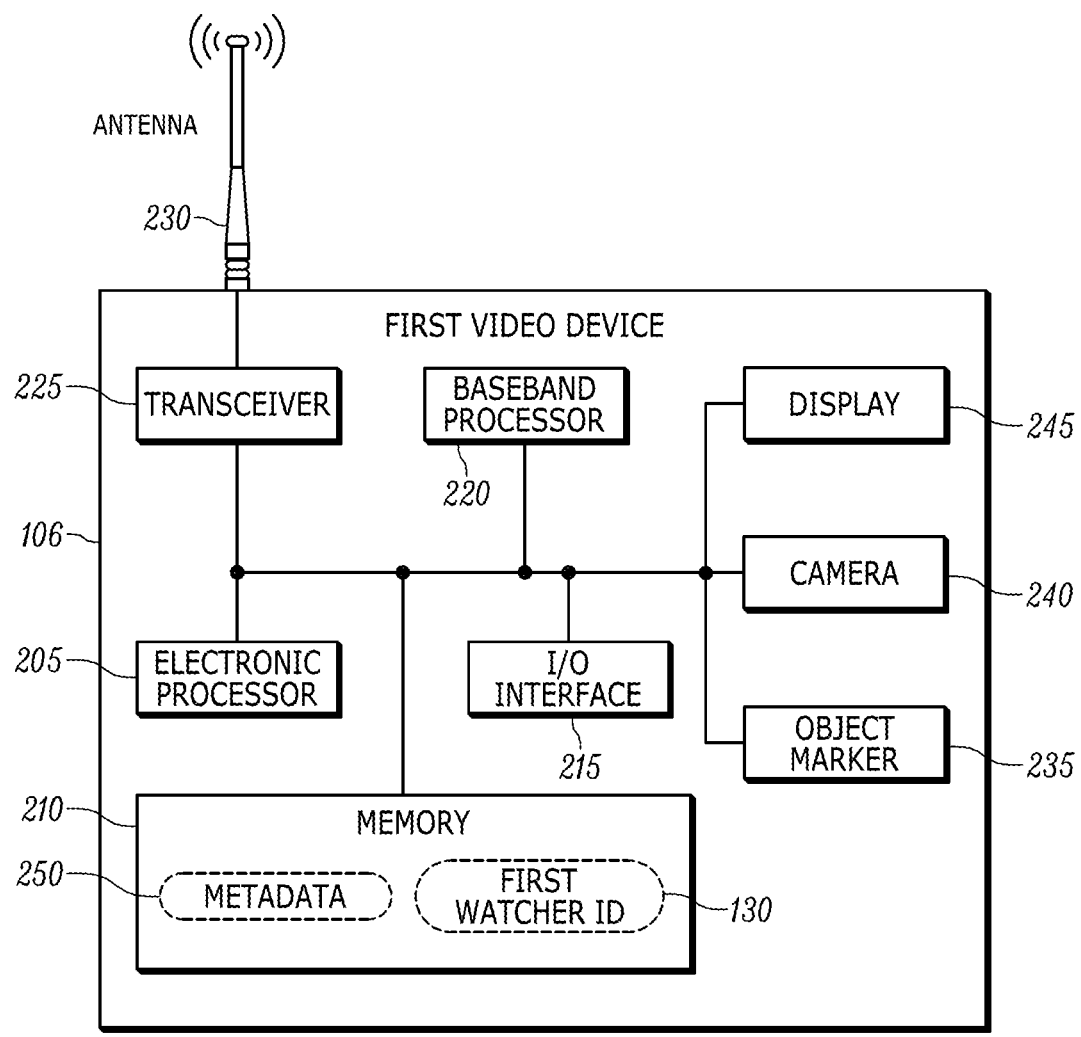
FIG. 2 is a diagram of a video device in accordance with some embodiments.

The first video device 106, the second video device 108, and the camera 110 include image capture devices for capturing images and video streams, including a portion of or the entire incident scene 114. The first video device 106 and the second video device 108, described more particularly below with respect to FIG. 2, are worn and operated by the first watcher 107 and the second watcher 109, respectively. As used herein, the term "watcher" refers to personnel, for example, police officers, fire fighters, medical first responders, and the like, who are responding to an incident at the incident scene 114. A watcher is outfitted with an electronic device similar to, for example, the first video device 106, which, as described below, is capable of determining what object of interest the watcher is observing.

The camera 110 may be a vehicle dash camera, a surveillance camera, a traffic camera, or another suitable image capture device that records video of the incident scene 114 from a fixed or movable position. As shown in FIG. 1, the watchers and the video devices need not be located within the incident scene 114 in order to capture video images of the incident scene 114.

The first video device 106, the second video device 108, and the camera 110 transmit their respective captured images and video streams to the server 102, via the communications network 112. In some embodiments, the first video device 106 and the second video device 108 may receive video streams directly from one another or the camera 110, or indirectly from the server 102 via the communications network 112.

An incident may be a public safety operation, for example, responding to a crime, responding to a traffic accident, searching for a suspect, locating a missing person, responding to a fire, responding to a medical emergency, and the like. As noted above, the response to the incident by public safety personnel may be recorded on video by the first video device 106, the second video device 108, and the camera 110. The recorded video may capture video of objects of interest within the incident scene 114. For example, an incident may involve the first object of interest 116, the second object of interest 118, and the third object of interest 120.

An object of interest may be any object present at the incident scene, which object is related to the incident. An object is related to the incident if it is involved in or relevant to the response to or investigation of the incident. Objects of interest may include, for example, automobiles (for example, in the case of a traffic accident), weapons (for example, in the case of a crime scene), people (for example, victims or suspects), buildings, or portions of buildings (for example, doors and windows). Objects of interest may also be tangible things not commonly thought of as objects, but which are still relevant to the response to or subsequent investigation of an incident response (for example, fluids leaked from automobiles, debris from damaged property, and blood). The incident scene 114 may include fewer or more than three objects of interest.

In some embodiments, the server 102, the first video device 106, and the second video device 108 include software and hardware to electronically detect and classify objects within images and video streams captured by the devices (for example, video processors and object classifier algorithms). Object classification is known in the art, and will not be described in detail herein. The detected objects of interest are assigned object identifiers, and stored in the database 104.

All objects of interest may not be captured by all image capture devices monitoring the incident scene 114. For example, as shown in FIG. 1, the first video device 106 has a field of view 122, in which can be seen the first object of interest 116 and the third object of interest 120. However, the second object of interest 118 may be partially obscured by the first object of interest 116. Similarly, the field of view 124 for the camera 110 does not include the third object of interest 120, and the second object of interest 118 may partially obscured the view of the first object of interest 116. Accordingly, it may be necessary to view multiple video streams to get a complete view of all objects of interest during the response to the incident.

As described in detail below, with respect to FIG. 2, the first video device 106 includes hardware and software for detecting the gaze 126 of the first watcher 107, and associating a first watcher identifier 130 (which corresponds to the first watcher 107) with the object of interest being observed by the first watcher 107 (for example, the first object of interest 116). Similarly, the second video device 108 detects the gaze 128 of the second watcher 109 and associates a second watcher identifier 132 with the first object of interest 116. Should either the first watcher 107 or the second watcher 109 adjust their gaze to observe a different object of interest, their respective watcher identifier will then be associated with the new object of interest.

FIG. 2 illustrates an example of the first video device 106. The second video device 108 includes similar components and is configured similarly to the first video device 106. In the embodiment illustrated, the first video device 106 includes an electronic processor 205, a memory 210, an input/output interface 215, a baseband processor 220, a transceiver 225, an antenna 230, an object marker 235, a camera 240, and a display 245. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, the first watcher identifier 130 and metadata 250 (both described in detail below).

The input/output interface 215 is configured to receive input and to provide system output. The input/output interface 215 obtains information and signals from, and provides information and signals to, (for example, over one or more wired and/or wireless connections) devices both internal and external to the first video device 106.

The electronic processor 205 is configured to control the baseband processor 220 and the transceiver 225 to transmit and receive video and other data to and from the first video device 106. The baseband processor 220 encodes and decodes digital data sent and received by the transceiver 225. The transceiver 225 transmits and receives radio signals to and from, for example, the communications network 112 using the antenna 230. The electronic processor 205, the baseband processor 220, and the transceiver 225 may include various digital and analog components, which for brevity are not described herein and which may be implemented in hardware, software, or a combination of both. Some embodiments include separate transmitting and receiving components, for example, a transmitter and a receiver, instead of a combined transceiver 225.

Some embodiments include an object marker 235 for marking on an object of interest being observed by the watcher 107. In some embodiments, the object of interest being observed is determined based on a direction in which the head of the watcher 107 is pointing. For example, the first video device 106 may be integrated with or coupled to smart glasses or a helmet worn by the first watcher 107. In some embodiments, the object marker 235 is a laser marker projecting from the watcher in the direction of the watcher's gaze. For example, a laser may be integrated into or mounted on smart glasses worn by the first watcher 107. The laser would project a modulated beam outside of the human-visible spectrum in the direction of the gaze 126 (see FIG. 1), which beam would appear on the first object of interest 116. The first object of interest 116, and the modulated laser beam may be captured by one or all of the first video device 106, the second video device 108, and the camera 110 in their respective video streams. The modulation of the laser corresponds to the first watcher identifier 130. Likewise, a modulation produced by the second video device 108 corresponds to the second watcher identifier 132. As described in detail below, the identity of the watcher or watchers of an object of interest can thus be determined by decoding the modulated laser beam(s) present on the object in a video stream.

In some embodiments, the electronic processor 205 determines what object of interest is being observed by using known gaze detection techniques and hardware (not shown) integrated into or coupled to the first video device 106. Gaze detection may be used to aim a laser in the direction of the gaze, or may be used in conjunction with video processing to identify the object of interest being observed by the first watcher 107.

The camera 240 is an image capture device for capturing images and video streams, including a portion or the entire incident scene 114, by, for example, sensing light in at least the visible spectrum. The camera 240 communicates the captured images and video streams to the electronic processor 205 via the input/output interface 215. It should be noted that the terms "image" and "images," as used herein, may refer to one or more digital images captured by the camera 240, or processed by the electronic processor 205, or displayed on the display 245. Further, the terms "image" and "images," as used herein, may refer to still images or sequences of images (that is, a video stream). As illustrated, the camera 240 is integrated into the first video device 106. In alternative embodiments, the camera 240 is separate from the first video device 106, and communicates captured images to the first video device 106 via a wired or wireless connection. For example, the camera 240 may be integrated into a body-worn camera or smart glasses, which communicate with the first video device 106.

In some embodiments, the camera 240 may be a stereoscopic camera, or the first video device 106 may include a stereoscopic camera. In such embodiments, the first video device 106 can capture three-dimensional information about the incident scene 114 and the objects of interest. In some embodiments, three-dimensional information may be captured using radar sensors or infrared ranging sensors (not shown).

The display 245 is a suitable display such as, for example, a liquid crystal display (LCD) touch screen, or an organic light-emitting diode (OLED) touch screen. The first video device 106 implements a graphical user interface (GUI) (for example, generated by the electronic processor 205, from instructions and data stored in the memory 210, and presented on the display 245), that enables a user to interact with the first video device 106. In some embodiments, the first video device 106 operates or is integrated with a head-mounted display (HMD), an optical head-mounted display (OHMD), or the display of a pair of smart glasses.

In some embodiments, the first video device 106 operates using, among other things, augmented reality technology, where live images are captured by the camera 240 and displayed (for example, on the display 245) with text, graphics, or graphical user interface elements superimposed on or otherwise combined with the live images.

As described in detail below, the first video device 106 is capable of receiving and processing images captured by the camera 240, and displaying processed images in a graphical user interface on the display 245. Computerized image capturing and processing techniques are known, and will not be described in detail.

In some embodiments, the first video device 106 is a body worn camera. In other embodiments, the first video device 106 may be smart glasses, integrated into a helmet or other headgear, or may be another portable or mobile electronic device containing software and hardware enabling it to operate as described herein.

FIG. 3 illustrates the server 102 in more detail. In the example provided, the server 102 includes an electronic processor 302, a storage device 304, and a communication interface 306. The electronic processor 302, the storage device 304, and the communication interface 306 communicate over one or more communication lines or buses, wirelessly, or a combination thereof.

The electronic processor 302 may include a microprocessor, application-specific integrated circuit (ASIC), or another suitable electronic device. The storage device 304 includes a non-transitory, computer-readable storage medium. The communication interface 306 may include a transceiver (for example, a Wi-Fi or Ethernet transceiver) for communicating over the communications network 112 and, optionally, one or more additional wired or wireless communication networks or connections. The electronic processor 302 is configured to retrieve from the storage device 304 and execute, among other things, software related to the processes and methods described herein.

As noted above, an object of interest may be any object present at the incident scene, which object is related to the incident. In some instances, the effectiveness of the response or the safety of the responders to an incident may depend on whether the incident scene and, one or more of the objects of interest present at the scene, are under adequate visual control. For example, when police officers respond to an incident including a group of criminal suspects, it may be advisable to visually monitor each suspect. In another example, it may be advisable to visually monitor each of multiple windows and doors on a building to prevent the undetected escape of a suspect or the appearance of a threat to the responders. In another example, some objects of interest may have evidentiary value and ensuring that those objects are continuously visually monitored may improve confidence, during future proceedings, that the evidence has been preserved. In another example, it may be desirable that each victim on the scene of a medical emergency is being or has been observed by emergency personnel. As a consequence, there is a need for identifying which personnel ("watchers") responding to an incident scene are watching which object of interest, and alerting available watchers that one or more objects of interest are unwatched or not being watched adequately.

Figure 4:
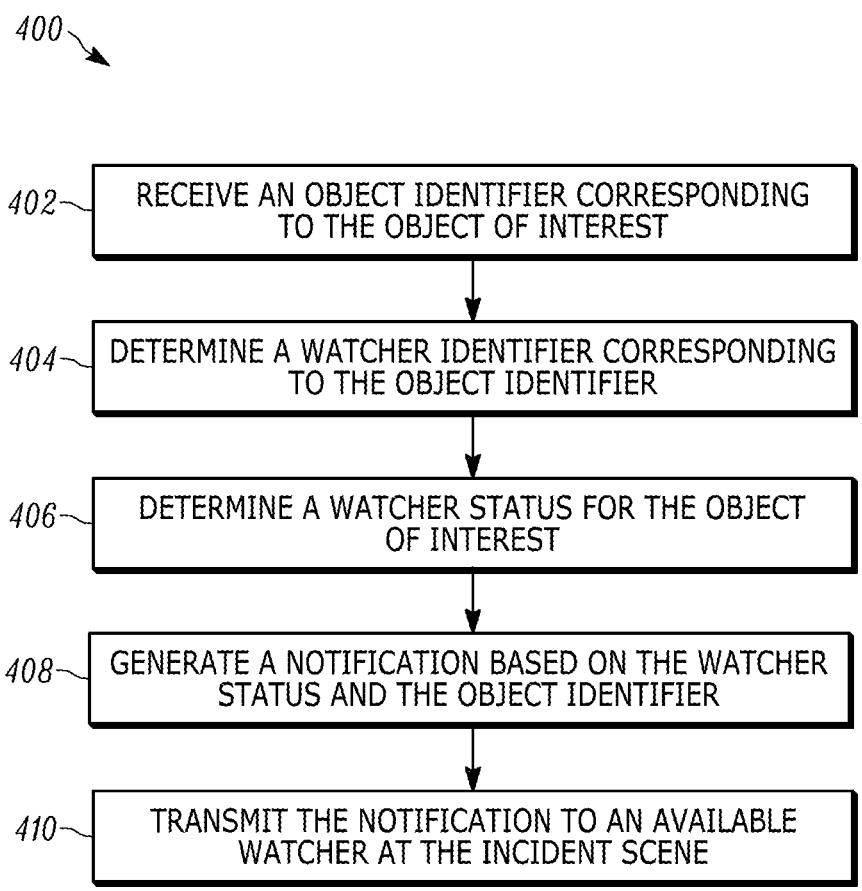
FIG. 4 is a flowchart of a method for identifying watchers of an object of interest at an incident scene in accordance with some embodiments.

Accordingly, FIG. 4 illustrates a method 400 for identifying watchers of an object of interest at an incident scene. The method 400 is described as being performed by the server 102 and, in particular, the electronic processor 302. However, it should be understood that in some embodiments, portions of the method 400 may be performed by other devices, including for example, the first video device 106 and the second video device 108. For example, the video device 106 of the first watcher 107 may receive and process video streams as described below to provide the first watcher 107 with near real time visual feedback of an incident to which the first watcher 107 is responding. For ease of description, portions of the method 400 are described in terms of a single object of interest (for example, the first object of interest 116). It should be understood that embodiments of the method 400 may be used to identify multiple watchers for multiple objects of interest.

As illustrated in FIG. 4, at block 402, the electronic processor 302 receives an object identifier corresponding to the object of interest. In some embodiments, the electronic processor 302 receives the object identifier, via the communication interface 306 from the first video device 106 or the second video device 108 as part of a video stream that includes the object of interest to which the object identifier corresponds. In another example, the electronic processor 302 may receive the object identifier from the database 104.

At block 404, the electronic processor 302 determines a watcher identifier corresponding to the object identifier. In some embodiments, the electronic processor 302 determines the watcher identifier from data received in the video stream from the first video device 106 or the second video device 108. The watcher identifier corresponds to a watcher of the object of interest, as identified by the object identifier received at block 402. In one example, shown in FIG. 1, where the object identifier corresponds to the first object of interest 116, the electronic processor 302 may receive the first watcher identifier 130.

At block 406, the electronic processor 302 determines a watcher status for the object of interest. A watcher status is an indication of which and how many watchers are watching the object of interest, and may also include some information relating to the watchers of the object of interest (for example, from the metadata 250). As noted above, the first video device 106 stores metadata 250 in the memory 210. The metadata 250 relates to the first watcher 107, who operates the first video device 106. In some embodiments, the metadata 250 may include the rank of the first watcher 107, a role assigned to the first watcher 107, and identifying information for the first watcher 107. The second video device 108 similarly incudes metadata for the second watcher 109.

In some embodiments, the electronic processor 302 receives an available watcher identifier corresponding to an available watcher at the incident scene. An available watcher is a responder to the incident, who is using a video device to record the incident response. For example, for the incident scene 114, the available watchers are the first watcher 107 and the second watcher 109. In such embodiments, the electronic processor 302 determines the watcher status based on the watcher identifier and the available watcher identifier. For example, in some instances, the electronic processor 302 is unable to determine a watcher identifier for the object of interest. This indicates that there are no watchers of that object of interest. For example, where the object identifier corresponds to the second object of interest 118 or the third object of interest 120, neither of the available watchers (the first watcher identifier 130 and the second watcher identifier 132) corresponds to those objects of interest.

In some embodiments, the watcher status is based on a quantity of watchers for the object of interest. For example, when responding to apprehend a criminal suspect, it may be advisable to have two officers watching the suspect at all times. In such embodiments, the electronic processor 302 determines more than one watcher identifier corresponding to the object identifier. This indicates that more than one watcher is watching the object of interest. The electronic processor 302 determines a quantity of watchers for the object of interest based on the watcher identifiers. The electronic processor 302 also determines a watcher threshold for the object of interest. In this example, the threshold is two watchers. In such embodiments, the electronic processor 302 determines the watcher status based on the quantity of watchers and the watcher threshold. For example, the watcher status indicates that more watchers are needed if the threshold is not met, and indicates that the object of interest is adequately watched when the threshold is met.

In some embodiments, the watcher status is based on a watcher priority. For example, it may be desirable that a watcher of sufficient priority is watching an object of interest. In such embodiments, the electronic processor 302 determines a watcher priority threshold for the object of interest. The watcher priority threshold may be, for example, a minimum rank or a particular role assignment. For example, it may be desirable that an object of interest at an incident be monitored by at least one supervisor. In another example, it may be desirable that an object of interest considered to be evidence be watched at all times by an evidence technician. The electronic processor 302 determines a watcher priority for the object of interest based on the watcher identifier. For example, the watcher identifier may be used to retrieve information on the rank or role assigned to the watcher. In such embodiments, the electronic processor 302 determines the watcher status based on the watcher priority and the watcher priority threshold. For example, the watcher status may indicate that the watchers of the object of interest meet the threshold, or it may indicate that the watcher priority threshold is not met.

In some embodiments, the watcher status is based on whether a particular watcher, deemed to be critical, is watching the object of interest. In such embodiments, the electronic processor 302 determines a critical watcher identifier for the object of interest. For example, the electronic processor 302 may receive the critical watcher identifier from a computer aided dispatch system via the communication interface 306. In such embodiments, the electronic processor 302 determines the watcher status based on the critical watcher identifier and the watcher identifier. For example, the watcher status will indicate whether or not the critical watcher is watching the object of interest.

Regardless of how the watcher status is determined, at block 408, the electronic processor 302 generates a notification based on the watcher status and the object identifier. The notification message includes the watcher status for the object of interest corresponding to the object identifier. The notification message may include a request for an available watcher, or a particular watcher, to watch the object of interest.

At block 410, the electronic processor 302 transmits the notification to an available watcher at the incident scene. For example, as illustrated in FIG. 1, both the first watcher 107 and the second watcher 109 are available watchers. When the object identifier corresponds to the second object of interest 118, the electronic processor 302 determines that no available watcher is watching the second object of interest 120. The electronic processor 302 may determine that the second watcher 109 should shift its gaze from the first object of interest 116 to the second object of interest 118. In such embodiments, the electronic processor 302 transmits the notification to the second watcher 109. In embodiments where a critical watcher is needed, the electronic processor 302 transmits the notification to the available watcher corresponding to the critical watcher identifier. In some embodiments, the electronic processor 302 transmits the notification to the available watcher on or near the incident scene 114 with a supervisory role or the highest rank.

In some embodiments, the server 102 receives and processes video streams to identify objects of interest and watchers at an incident scene. In some embodiments, this may be performed while the incident is occurring, to provide near real time feedback to responders. In other embodiments, the video processing may be performed subsequent to the incident, and may be used to assist investigators reviewing the incident response.

In one embodiment, the electronic processor 302 receives a first video stream including the object of interest. In one example, the electronic processor 302 receives a video stream produced by the first video device 106. In such embodiments, the electronic processor 302 detects the object of interest (for example, the first object of interest 116) in the first video stream, for example, using an object classifier. When the object is detected, the electronic processor 302 receives the object identifier by, for example, assigning an object identifier or retrieving an object identifier from the database 104. The electronic processor 302 determines a watcher identifier by detecting the watcher identifier on the object of interest. In some embodiments, the electronic processor 302 detects at least one optical laser marker on the object of interest, for example, produced by the object marker 235 of the first video device 106. The electronic processor 302 detects the watcher identifier based on the at least one optical laser marker. In some embodiments, the electronic processor 302 decodes a modulation of the optical laser marker to determine the watcher identifier. For example, as illustrated in FIG. 1, the first object of interest 116 includes the first watcher identifier 130 and the second watcher identifier 132.

Figure 5A:
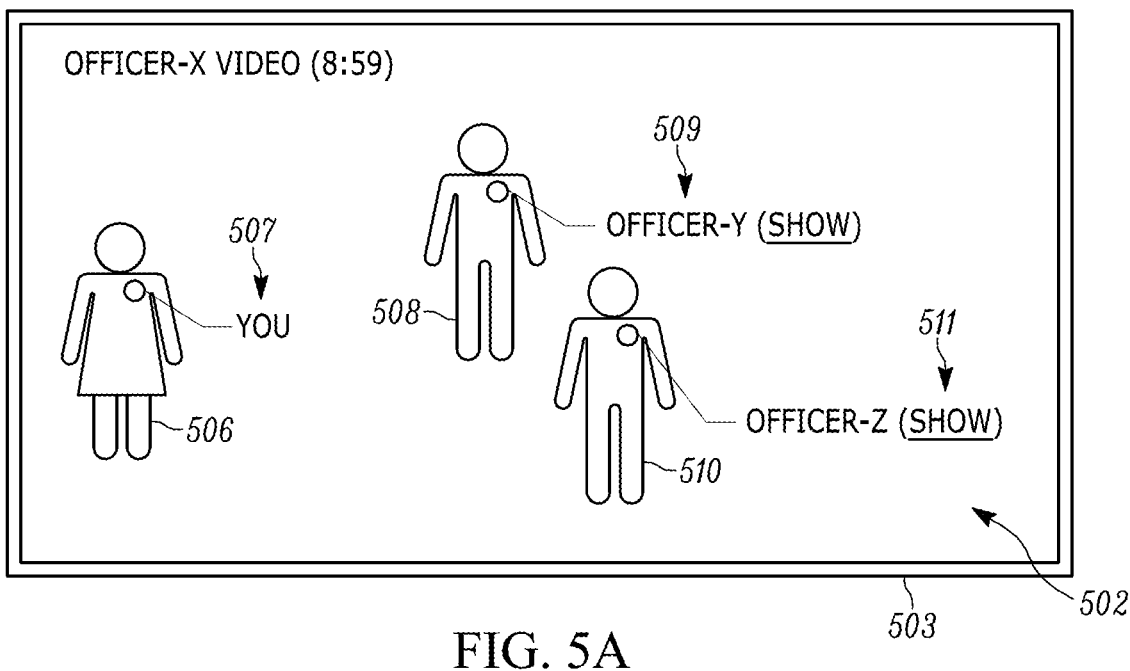
FIGS. 5A and 5B are example images produced by the system of FIG. 1 in accordance with some embodiments.

In some embodiments, the electronic processor 302 generates a first modified video stream by superimposing the watcher status on the first video stream, and presents the first modified video stream on a display. For example, in as illustrated in FIG. 5A, a modified video stream 502 is shown presented on a display 503. The modified video stream 502 includes three objects of interest 506, 508, and 510. Superimposed on the modified video stream 502 are watcher statuses 507, 509, and 511, which correspond respectively to objects of interest 506, 508, and 510. As illustrated in FIG. 5A, the watcher statuses 507, 509, and 511 indicate the name and rank of the watcher observing the object of interest. Watcher statuses 509 and 511 indicate that "Officer Y" and "Officer Z" are watching objects of interest 508 and 510, respectively. Watcher status 507, "You," indicates that "Officer X," the contributor of the video stream is watching object of interest 506. In some embodiments, the display 503 is part of a computing device used by, for example, a supervisor reviewing the incident response after the fact.

In some embodiments, the display 503 is part of a video device (for example, the first video device 106) worn by a watcher during the incident. For example, the display 503 may be part of a pair of smart glasses worn by Officer X. In such embodiments, the modified video stream 502 provides the wearer of the display with a near real time view of the incident and intelligence on who is watching what during the incident response. For example, a modified video stream based on the incident scene 114 of FIG. 1 may indicate to the first watcher 107 and the second watcher 109 that both are watching the first object of interest 116, and that no one is watching the second object of interest 118 and the third object of interest 120. The modified video stream 502 may be generated by the video device locally, or may be produced by the server 102 and transmitted to the video device.

In some embodiments, the first modified video stream is generated by superimposing the watcher status and the notification on the first video stream. For example, when the notification indicates that an object of interest is not being watched, that object of interest may be highlighted. In another example, an indicator such as "No Watchers" or "Priority Not Met" may be superimposed on objects of interest as appropriate.

Figure 5B:
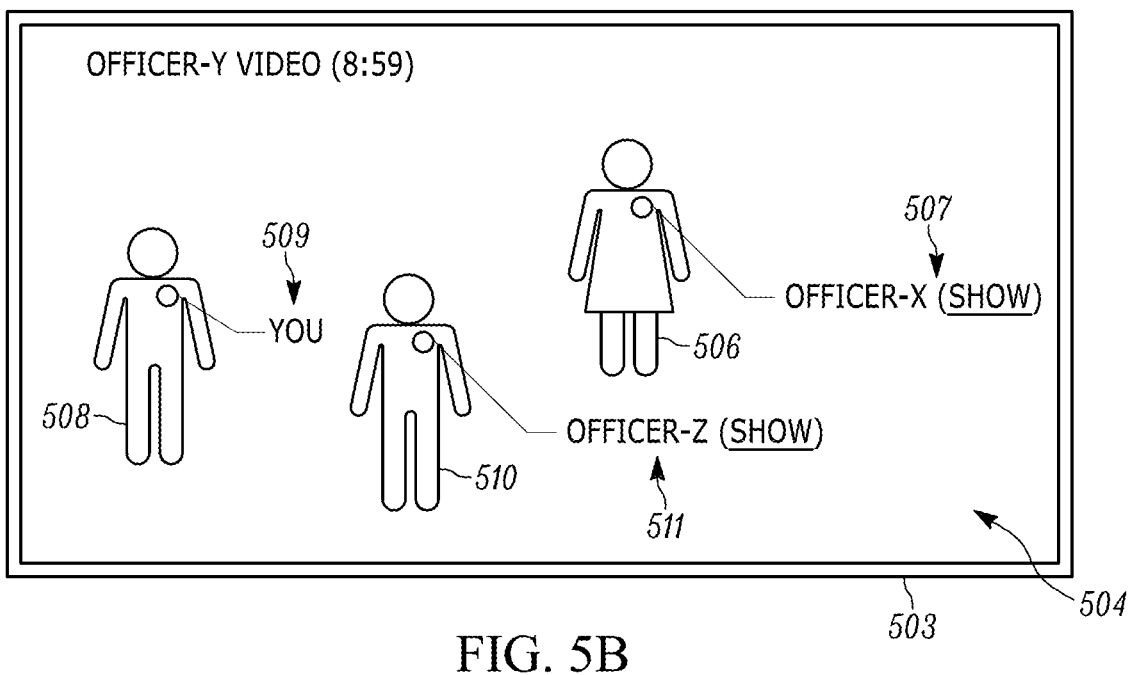

In some embodiments, the electronic processor 302 receives a second video stream including the object of interest (which is also present in the first video stream). As described above, the electronic processor 302 detects the object of interest in the second video stream. The electronic processor 302 generates a second modified video stream by superimposing the watcher status on the second video stream. For example, FIG. 5B illustrates a second modified video stream 504. The second modified video stream 504 includes the same objects of interest 506, 508, and 510 and corresponding watcher statuses 507, 509, and 511. However, as shown in FIG. 5B, the second modified video stream 504 is generated from an video stream contributed by Officer Y. Accordingly, watcher statuses 507 and 511 indicate that "Officer X" and "Officer Z" are watching objects of interest 506 and 510, respectively. The watcher status 509 is "You," indicating that "Officer Y," is watching object of interest 508.

In some embodiments, when both the modified video stream 502 and the second modified video stream 504 are generated by the server 102, the server 102 is configured to receive a user input selecting which video stream to present on the display 503. In some embodiments, the user input corresponds to one of the watcher identifiers present in the modified video streams, allowing a user to view the incident response from the different perspectives. For example, an investigator reviewing video for an incident response involving objects of interest 506, 508, and 510 may wish to focus on object of interest 508. When the watcher status 509 (FIG. 5A), is selected in modified video stream 502, the electronic processor 302 will stop displaying the modified video stream 502 and begin displaying the second modified video stream 504 (FIG. 5B), which presents the same incident response, but from the perspective of Officer Y instead of Officer X. In some embodiments, as shown in FIGS. 5A and 5B, the second modified video stream 504 begins playing at the same time where the modified video stream 502 left off.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for identifying available watchers of an object of interest at an incident scene, the system comprising:
   a communication interface; and
   an electronic processor communicatively coupled to the communication interface, and configured to receive, via the communication interface, an object identifier corresponding to the object of interest;

receive a first video stream including the object of interest;

detect the object of interest in the first video stream;

detect a modulated optical laser marker on the object of interest, the modulation of the laser marker corresponding to a watcher of the object of interest;

detect a watcher identifier for the watcher of the object of interest based on the optical laser marker;

determine a watcher status for the object of interest based on the watcher identifier, or on an absence of any watcher identifiers, the watcher status including an indication of which of a plurality of responders at the incident scene are observing the object of interest;

determine whether the object of interest is adequately watched based on the watcher status for the object of interest;

responsive to the watcher status indicating that the object of interest is not adequately watched by the plurality of responders at the incident scene, generate a notification message including a request for an available watcher to watch the object of interest;

receive an available watcher identifier corresponding to an available watcher at the incident scene, wherein the available watcher is selected from the plurality of responders; and transmit the notification message to the available watcher at the incident scene.

2. The system of claim 1, wherein the electronic processor is further configured to determine a quantity of watchers for the object of interest based on the at least one watcher identifier;

determine a watcher threshold for the object of interest, the watcher threshold including an indication of whether a sufficient quantity of responders is watching the object of interest; and determine the watcher status based on the quantity of watchers and the watcher threshold.

3. The system of claim 1, wherein the electronic processor is further configured to determine a watcher priority threshold of the object of interest, the watcher priority threshold including an indication of whether responders of sufficient rank and role are watching the object of interest;

determine a watcher priority for the object of interest based on the watcher identifier; and determine the watcher status based on the watcher priority and the watcher priority threshold.

4. The system of claim 1, wherein the electronic processor is further configured to determine a critical watcher identifier for the object of interest, the critical watcher identifier identifying a particular one of the plurality of responders that is deemed to be critical;

determine the watcher status based on the critical watcher identifier and the watcher identifier; and transmit the notification based on the critical watcher identifier.

5. The system of claim 1, wherein the electronic processor is further configured to detect the object of interest in the first video stream using an object classifier based on the object identifier.

6. The system of claim 5, further comprising:

a display communicatively coupled to the electronic processor;

wherein the electronic processor is further configured to generate a first modified video stream by superimposing the watcher status on the first video stream; and present the first modified video stream on the display.

7. The system of claim 6, wherein the electronic processor is further configured to generate the first modified video stream by superimposing the watcher status and the notification on the first video stream.

8. The system of claim 6, wherein the electronic processor is further configured to receive a second video stream including the object of interest;

detect the object of interest in the second video stream;

detect a second watcher identifier on the object of interest;

determine the watcher status for the object of interest based on the watcher identifier, the second watcher identifier, and the available watcher identifier;

generate a second modified video stream by superimposing the watcher status on the second video stream receive a user input corresponding to one of the watcher identifier and the second watcher identifier; and present, on the display, either the first modified video stream or the second modified video stream based on the user input.

9. A method for identifying available watchers of an object of interest at an incident scene, the method comprising:

receiving, with an electronic processor, an object identifier corresponding to the object of interest;

receiving a first video stream including the object of interest;

detecting the object of interest in the first video stream;

detecting a modulated optical laser marker on the object of interest, the modulation of the laser marker corresponding to a watcher of the object of interest;

detecting a watcher identifier for the watcher of the object of interest based on the optical laser marker;

determining a watcher status for the object of interest based on the watcher identifier, or on an absence of any watcher identifiers, the watcher status including an indication of which of a plurality of responders at the incident scene are observing the object of interest;

determining whether the object of interest is adequately watched based on the watcher status for the object of interest;

responsive to the watcher status indicating that the object of interest is not adequately watched by the plurality of responders at the incident scene, generating a notification message including a request for an available watcher to watch the object of interest;

receiving an available watcher identifier corresponding to an available watcher at the incident scene, wherein the available watcher is selected from the plurality of responders; and transmitting, with a communication interface communicatively coupled to the electronic processor, the notification message to the available watcher at the incident scene.

10. The method of claim 9, further comprising:

determining a quantity of watchers for the object of interest based on the at least one watcher identifier;

determining a watcher threshold for the object of interest, the watcher threshold including an indication of whether a sufficient quantity of responders is watching the object of interest; and determining the watcher status based on the quantity of watchers and the watcher threshold.

11. The method of claim 9, further comprising:
determining a watcher priority threshold of the object of interest, the watcher priority threshold including an indication of whether responders of sufficient rank and role are watching the object of interest;
determining a watcher priority for the object of interest based on the watcher identifier; and
determining the watcher status based on the watcher priority and the watcher priority threshold.

12. The method of claim 9, further comprising:
determining a critical watcher identifier for the object of interest, the critical watcher identifier identifying a particular one of the plurality of responders that is deemed to be critical;
determining the watcher status based on the critical watcher identifier and the watcher identifier; and
transmitting the notification includes transmitting the notification based on the critical watcher identifier.

13. The method of claim 9, further comprising:
detecting the object of interest in the first video stream using an object classifier based on the object identifier.

14. The method of claim 13, further comprising:
generating a first modified video stream by superimposing the watcher status on the first video stream; and
presenting, on a display communicatively coupled to the electronic processor, the first modified video stream.

15. The method of claim 14, further comprising:
generating a first modified video stream by superimposing the watcher status and the notification on the first video stream.

16. The method of claim 14, further comprising:
receiving a second video stream including the object of interest;
detecting the object of interest in the second video stream;
detecting a second watcher identifier on the object of interest;
determining the watcher status for the object of interest based on the watcher identifier, the second watcher identifier, and an available watcher identifier corresponding to the available watcher;
generating a second modified video stream by superimposing the watcher status on the second video stream
receiving a user input corresponding to one of the watcher identifier and the second watcher identifier; and
presenting, on the display, either the first modified video stream or the second modified video stream based on the user input.

* * * * *